United States Patent [19]
Harland et al.

[11] Patent Number: 5,871,255
[45] Date of Patent: Feb. 16, 1999

[54] VEHICLE SEAT

[75] Inventors: Charles E. Harland, Livonia; Dianna L. Sabo, Novi, both of Mich.

[73] Assignee: Chrysler Corporation, Auburn Hills, Mich.

[21] Appl. No.: 779,278

[22] Filed: Jan. 6, 1997

[51] Int. Cl.$^6$ .............................. A47C 15/00; B60N 2/02
[52] U.S. Cl. ................... 297/257; 297/378.13; 297/336; 296/65.1; 296/69
[58] Field of Search ..................................... 297/257, 232, 297/188.04, 113, 370.13, 335, 336; 296/65.1, 66, 69

[56] References Cited

U.S. PATENT DOCUMENTS

| | | |
|---|---|---|
| 324,232 | 8/1985 | Clarkson . |
| 3,635,521 | 9/1972 | Shivvers . |
| 4,194,782 | 3/1980 | Itoh . |
| 4,227,736 | 10/1980 | Lebault et al. . |
| 4,368,916 | 1/1983 | Blasin . |
| 4,475,769 | 10/1984 | Crawford et al. . |
| 4,484,776 | 11/1984 | Gokimoto et al. . |
| 4,533,175 | 8/1985 | Brennan . |
| 4,573,225 | 3/1986 | Wolf . |
| 4,627,656 | 12/1986 | Gokimoto et al. . |
| 4,637,081 | 1/1987 | Clark . |
| 4,699,418 | 10/1987 | Plavetich . |
| 4,869,541 | 9/1989 | Wainwright ......................... 297/378.13 |
| 5,039,155 | 8/1991 | Suman et al. ............................ 296/65.1 |
| 5,044,683 | 9/1991 | Parsson ...................................... 269/69 |
| 5,150,946 | 9/1992 | Marifilius ................................. 297/113 |
| 5,195,795 | 3/1993 | Cannera et al. . |
| 5,248,178 | 9/1993 | Brambilla . |
| 5,269,581 | 12/1993 | Odagaki et al. . |
| 5,322,344 | 6/1994 | Hoffman et al. . |
| 5,364,152 | 11/1994 | Mastrangelo et al. . |
| 5,368,355 | 11/1994 | Hayden . |
| 5,383,699 | 1/1995 | Woziekonski et al. . |
| 5,466,048 | 11/1995 | Fowler et al. . |
| 5,492,386 | 2/1996 | Callum ..................................... 297/335 |
| 5,529,376 | 6/1996 | Jovan et al. ............................. 297/257 |
| 5,658,043 | 8/1997 | Davidson ................................. 297/113 |

*Primary Examiner*—Peter M. Cuomo
*Assistant Examiner*—Anthony D. Barfield
*Attorney, Agent, or Firm*—Roland A. Fuller, III

[57] ABSTRACT

A vehicle seat has a coupler for connecting the seat to the floor of a vehicle, and a first seat section. The first seat section is connected to the coupler, and includes a femur portion and a back portion. A second seat section is also connected to the coupler, and includes a femur portion and a back portion. A third seat section is additionally connected to the coupler and includes a femur portion and a back portion. The first and second seat sections are movable between: (1) a first position wherein the femur portion is generally parallel to the vehicle floor and the back portion is generally perpendicular to the vehicle floor; (2) a second position wherein the femur portion and the back portion are both generally parallel to the vehicle floor; and (3) a third position wherein the femur portion and back portion are both disposed generally perpendicular to the vehicle floor. The third seat section is movable between: (1) a first position wherein the femur portion is generally parallel to the vehicle floor and the back portion is generally perpendicular to the vehicle floor; and (2) a second position wherein the femur portion and back portion are both disposed generally parallel to the vehicle floor.

11 Claims, 7 Drawing Sheets

VEHICLE SEAT

TECHNICAL FIELD OF THE INVENTION

The present invention relates to vehicle seats and seating systems, and more particularly to a vehicle seating system especially adapted for use in connection with enhanced capacity vehicles (ECVs), such as station wagons, sport utility vehicles and vans that have an enlarged cabin area for carrying either more cargo or more passengers (or both) than a conventional sedan.

BACKGROUND OF THE INVENTION

In recent years, ECVs have become increasingly popular. Examples of such products include the FORD® TAURUS® Station Wagon, the JEEP® GRAND CHEROKEE® Sport Utility Vehicle, and the DODGE® CARAVAN® Mini-Van. These ECVs are all characterized by an enlarged cabin area that extends generally from the windshield of the vehicle, to the rear end of the vehicle where a tailgate (or rear hatch) is provided for rear access into the cabin.

The increased popularity of these vehicles can be attributed in some measure to their increased passenger carrying capacity when compared to conventional sedans. Most sedans include two rows of seats, including a front row in which the driver and front passenger(s) sit, and a first (and only) row of rear seats. Many ECVs include a second rear row of seats in addition to the front and back seats.

As both cargo and passenger carrying capacity are valued, it is desirable to design the first and second rear row of seats to be configured both to carry additional passengers and additional cargo, and to be convertible easily between an enhanced passenger carrying configuration, and an enhanced cargo carrying configuration.

Examples of patents showing various seating/cargo configurations for ECVs are Itoh U.S. Pat. No. 4,194,782; Odagaki et al. U.S. Pat. No. 5,269,581; LeBault et al. U.S. Pat. No. 4,277,736; Crawford et al. U.S. Pat. No. 4,475,769; Gokimoto et al. U.S. Pat. No. 4,484,776; Gokimoto et al. U.S. Pat. No. 4,627,656; Plavetich U.S. Pat. No. 4,699,418; Brambilla U.S. Pat. No. 5,248,178; Hayden et al. U.S. Pat. No. 5,368,355; Fowler et al. U.S. Pat. No. 5,466,048; and Woziekonski et al. U.S. Pat. No. 5,383,699.

Some of the patents described above disclose seats for use in vans and minivans, whereas others relate to seats for use in station wagons and sport utility vehicles. The design challenges faced by the designers of seats for vans are usually somewhat different than the challenges faced by those designing seats for station wagons and sport utility vehicles. Vans typically have a cargo compartment that is taller than the cargo compartments in either station wagons or sport utility vehicles. Additionally, vans usually have a flat floor which extends generally between the back of the front row of seats and the tailgate. On the other hand, station wagons and sport utility vehicles typically have a floor that comprises a series of platforms at different levels. For example, a station wagon will typically have a first floor platform which comprises the foot well of the second seat, another platform on which the femur portion of the first rear seat rests, and which also may comprise the foot well for the second rear seat, and a relatively raised platform on which the femur portion of the second rear seat is placed. As used in this application, the "femur portion" of a seat is that portion of a seat upon which the passenger places his/her buttocks and thighs during normal use.

Because of these different configurations, seats for vans are typically designed differently than seats for station wagons and sport utility vehicles. Most seats for vans are designed to be of chair height, and have relatively long legs which connect the lower surface of the femur portion to the floor of the van. As the floor of the van is generally flat, and has no foot wells, most van seats do not contain mechanisms for making the seat a part of the van floor when the user desires to carry cargo. Rather, van seats are often designed to be removable to enable the user to remove the seat from the van when he wishes to have a large cargo area.

To the contrary, most second and third seats for sport utility vehicles and station wagons are not designed to be removable. Rather, the seats are designed to be foldable. To move the seat between its "passenger carrying" position and its "cargo carrying" position, the back portion and/or the femur portion are rotated about pivot axes, so that one of the surface(s) of one or both of the back portions of the first and second rear seats are generally co-planar with the floor of the vehicle. When the first and second rear seats are placed in their "cargo" positions, a planar cargo surface can be formed which extends from the rearward facing surface of the front seats to the tailgate of the vehicle. An example of a folding arrangement that is usable in a station wagon is shown in LeBault et al. U.S. Pat. No. 4,227,736.

Notwithstanding the existence of several known seating arrangements that provide for seats that are capable of being moved between a passenger carrying position and a cargo carrying position, room for improvement exists.

It is therefore one object of the present invention to provide a seat system that includes a pair of seats having a first rear seat that provides comfortable and safe seating for the occupants when the seat is in its seating position, and which can be folded into a cargo carrying position that provides a generally planar cargo carrying compartment.

Another difficulty that faces a seat designer of vehicles having three rows of seats is providing a means to permit ingress to and egress from the third seat. Most station wagons, vans and sport utility vehicles that have three rows of seats include either four or five doors. Almost all vehicles include left and right "front" doors to permit passengers to gain access to the left hand and right hand front seats. Many station wagons, sport utility vehicles, and minivans manufactured by the assignee, Chrysler Corporation, contain two rear side doors that are placed adjacent to the second row of seats. On such vehicles, the rearward opening tailgate is typically counted as the "fifth" door.

Because the rear side doors of most ECVs are positioned adjacent to the first row of rear seats, means must be provided for enabling passengers to gain ingress and egress to the second row of rear seats. Several currently known methods exist for providing such access. For example, many station wagons such as the FORD® TAURUS® install a rearwardly facing second rear seat that permits passengers to gain access thereto through the tailgate door. On minivans, a common practice is to use a first rear seat that has a width substantially less than the width of the vehicle, to provide a space in the interior of the vehicle, adjacent to the door through which a passenger can pass to gain access to the second rear seat.

Both of these two methods of providing ingress have drawbacks. For example, vehicle length constraints often make rear facing second rear seats uncomfortable for passengers other than small children. Additionally, rearward facing second rear seats are generally not suitable for use with car seats, thus precluding their use by very young children. Reduced width first rear seats suffer the drawback of reducing the usable seat width, thus reducing the passenger carrying capacity of the vehicle.

It is therefore one object of the present invention to provide a full width first rear seat for a vehicle that provides access to the second rear row of seats to enable the second rear row of seats to be placed in a forward facing orientation.

SUMMARY OF THE INVENTION

A vehicle seat is provided that comprises a coupler means for connecting the seat to the floor of a vehicle, and a first seat section. The first seat section is connected to the coupler means, and includes a femur portion and a back portion. A second seat section is also connected to the coupler means, and includes a femur portion and a back portion. A third seat section is additionally connected to the coupler means and includes a femur portion and a back portion. The first and second seat sections are movable between: (1) a first position wherein the femur portion is generally parallel to the vehicle floor and the back portion is generally perpendicular to the vehicle floor; (2) a second position wherein the femur portion and the back portion are both generally parallel to the vehicle floor; and (3) a third position wherein the femur portion and back portion are both disposed generally perpendicular to the vehicle floor. The third seat section is movable between: (1) a first position wherein the femur portion is generally parallel to the vehicle floor and the back portion is generally perpendicular to the vehicle floor; and (2) a second position wherein the femur portion and back portion are both disposed generally parallel to the vehicle floor.

Preferably, the vehicle seat comprises a split-bench type vehicle seat, with the sections being all movable independently.

Preferably, the second seat is configured so that the rearward covers of the back portions of the first and second seats can be disposed in a generally co-planar relation when the back portions of the first and second seats are placed in their cargo carrying positions.

One feature of the present invention is that it includes a first seat having first, second and third independently movable seat sections. The first and second seat sections are independently movable between: (i) a first position wherein the femur portion is generally parallel to the vehicle floor and the back portion is generally perpendicular to the vehicle floor; (ii) a second position wherein the femur portion and the back portion are both generally parallel to the vehicle floor; and (iii) a third position wherein the femur portion and the back portion are both disposed generally perpendicular to the vehicle floor. The third section is movable between: (I) a first position wherein the femur portion is generally parallel to the vehicle floor and the back portion is generally perpendicular to the vehicle floor; and (II) a second position wherein the femur portion and back portion are both disposed generally parallel to the vehicle floor.

This feature has the advantage of creating a seat that provides easy passenger access to and from the second rear seat of a vehicle from either (or both) of the rear doors of the vehicle. This ease of ingress and egress makes it possible to position the second rear seat in a forward facing position, rather than in a rear facing position that relies upon the vehicle's tailgate for ingress and egress. Additionally, this feature permits the use of a "full width" first rear seat, which extends essentially all of the way between the rear doors. This full width first rear seat provides enhanced passenger carrying capacity, when compared to the reduced width seats of the type found on some minivans.

It is also a feature of the present invention that the seat sections are movable independently, with all three seat sections being placeable in a second position, with both of the femur and back portion being placed parallel to each other and also parallel to the vehicle floor. This feature has the advantage of providing a generally planar, somewhat elevated work surface that can be used by passengers in either the first or second rear seat. For example, the third (middle) section of the first rear seat can be placed in its second position, and used as a work surface upon which a telephone, fax, writing tablet, computer or television can be placed for use by passengers in either the first or third sections of the first rear seat, or passengers in the second rear seat. If more space is necessary, one or both of the first and second sections of the first rear seat can be placed in their second position, so that additional materials, electronic paraphernalia, or other cargo can be placed thereon.

An additional feature of the present invention is that the first rear seat can be placed in its second (cargo carrying) position, and when so placed, forms a generally co-planar cargo surface with the second rear seat. This feature has the advantage of enabling the vehicle to carry large amounts of cargo conveniently. As the surfaces are generally co-planar, heavy objects such as boxes and lawn mowers, can be respectively pushed or rolled into their appropriate position, without the user needing to lift the object.

These and other features of the present invention will be apparent to those skilled in the art upon a review of the detailed description and drawings of the presently perceived best mode of practicing the invention, which is set forth in more detail below.

DETAILED DESCRIPTION

Figure 1:
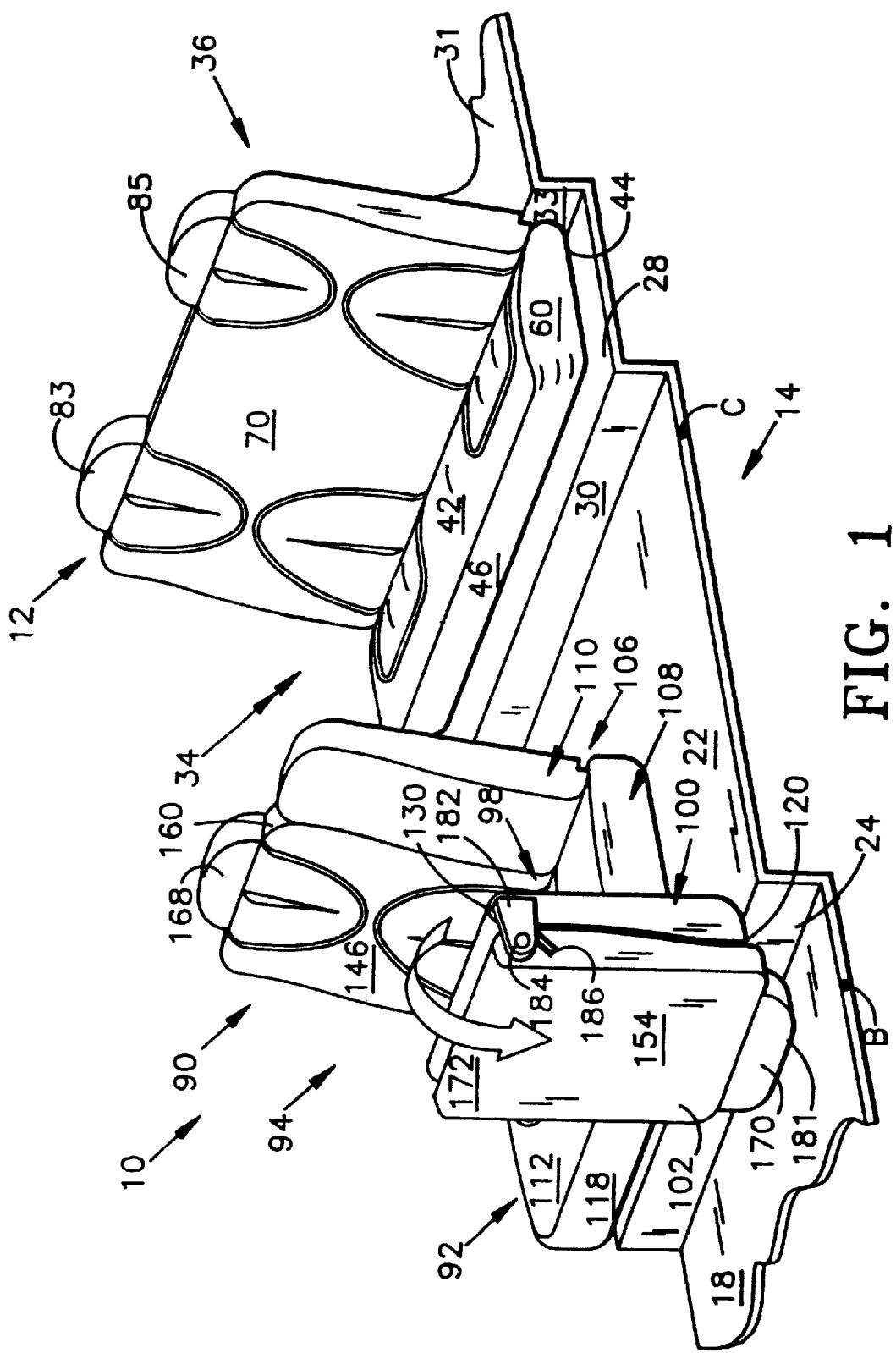
FIG. 1 is a perspective view of the present invention.

The seat system of the present invention is shown in the Figures as including a first seat 10 and a second seat 12. Typically, the first and second seats 10, 12 will comprise the second and third rows of seats in an ECV type vehicle having three rows of seats. Not shown in the drawings is the front row of seats, which can comprise either standard bucket seats, a bench seat or a split-bench seat.

The first and second seats 10, 12 are attached to the vehicle floor 14, and are positioned generally behind the front row of seats (not shown). The vehicle floor 14 includes a series of generally horizontally disposed platforms, that are placed at various levels. These platforms include a generally horizontally disposed first foot well platform 18, a second horizontally disposed platform 22, a first, generally vertically disposed transition floor section 24 for connecting the first and second horizontally disposed platforms 18, 22; a third horizontally disposed platform 28, and a second, generally vertically disposed transition floor section 30 that connects the second and third platforms 22, 28. Additionally, the platforms include a fourth horizontally disposed platform 31 (FIG. 6) that extends between the back of the second seat 12 and the tailgate (not shown) of the vehicle. The vehicle floor 14 can also include a front foot well platform (not shown) disposed forward of the front seats (not shown).

The first horizontally disposed platform 22 extends forwardly in front of the first seat 10, and can provide a surface on which the vehicle's front seats (not shown) can be mounted. For passengers sitting in the first rear seat 10, the first platform 18 serves as a foot well upon which the passengers can rest their feet.

The forward portion of the second horizontally disposed platform 22 provides a surface on which the first rear seat 10 can be placed. The second platform 22 is raised, relative to the level of the first platform 18. The rear portion of the second horizontally disposed platform 22 serves as a foot well for passengers sitting in the second seat 12. The third platform 28 is raised relative to the level of the second platform 22, and provides a surface on to which the second seat 12 is anchored. The third platform 28 extends generally between its point of intersection with the second, transition floor section 30, and the third transition section 33. The fourth platform 31 extends rearwardly from the third transition section 33 to the tailgate (not shown) of the vehicle.

The fourth platform section 31 generally defines the level of the cargo carrying floor of the vehicle when the first and second seats 10, 12 are placed in their cargo carrying positions. Although the first, second and third horizontally disposed platforms 18, 22, 28 are shown as being generally planar, they may include a central raised "hump" (not shown) to accommodate the vehicle's drive shaft. It will also be noted that the third platform 28 is at a relatively higher level than the second platform 22, which itself is at a relatively higher level than the first platform 18. This helps to provide theater-like seating to permit passengers in the second seat 12 to look over the second seat 10, and forwardly through the windshield. This theater-like seating helps to make passengers in the second seat 12 feel less claustrophobic.

It is believed that the seating system of the present invention will have its most wide spread use in vehicles having one or two side mounted rear doors, in addition to the usual two front doors and tailgate member. Such "four door" type vehicles (actually, "five door" if you include the tailgate) typically have a "B-pillar" area which occupies the space between the rearward edge of the front door and the forward edge of the rear door, and a "C-pillar" area which is placed adjacent to the rearward surface of the rear door. To give some perspective as to the positioning of the first and second seats 10, 12 of the present invention, the approximate position of the rearward edge of the B-pillar is indicated by "B" in the drawings, and the forward edge of the C-pillar is indicated by "C" in the drawings. As such, the opening provided by the rear door is generally that area between points B and C, the B-pillar and the C-pillar.

Figure 2:
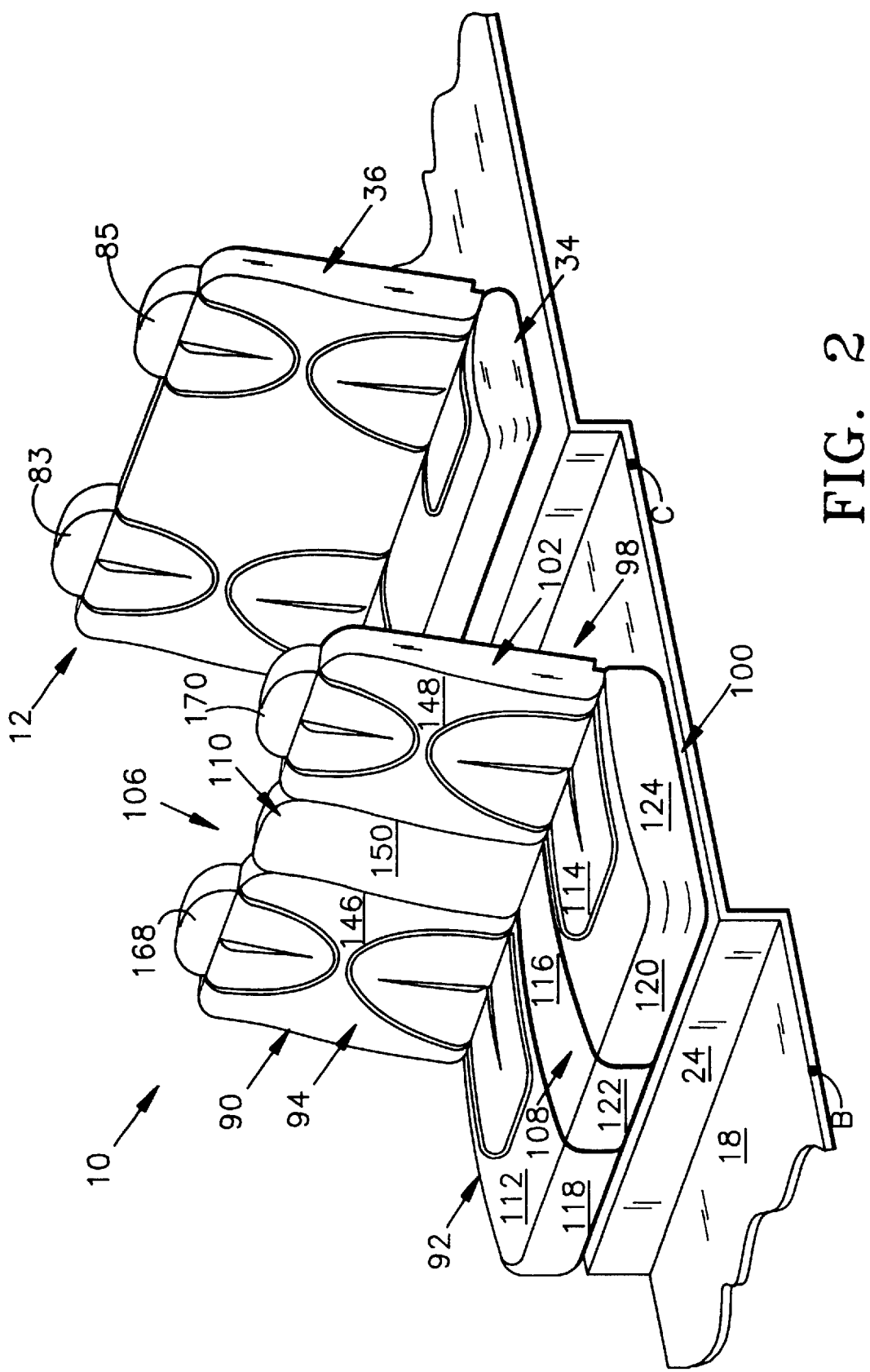
FIG. 2 is a perspective view of the present invention showing the first and second seats positioned differently than that shown in FIG. 1.

Turning now to FIG. 2, it will be noted that when the first seat 10 is in its upright, passenger carrying position, access to the second seat 12 through the rear doors (not shown) of the vehicle is obstructed by the seat 10 and the C pillar.

The second rear seat 12 comprises a seat having a generally unitary femur portion 34 upon which the passenger can place his/her buttocks and thighs, and a unitary back portion 36 upon which the user can rest his/her back. Although the second seat 12 is shown as a bench-type seat, it can also be manufactured as a split-bench-type seat, or alternately, have a split back portion 36.

Figure 3:
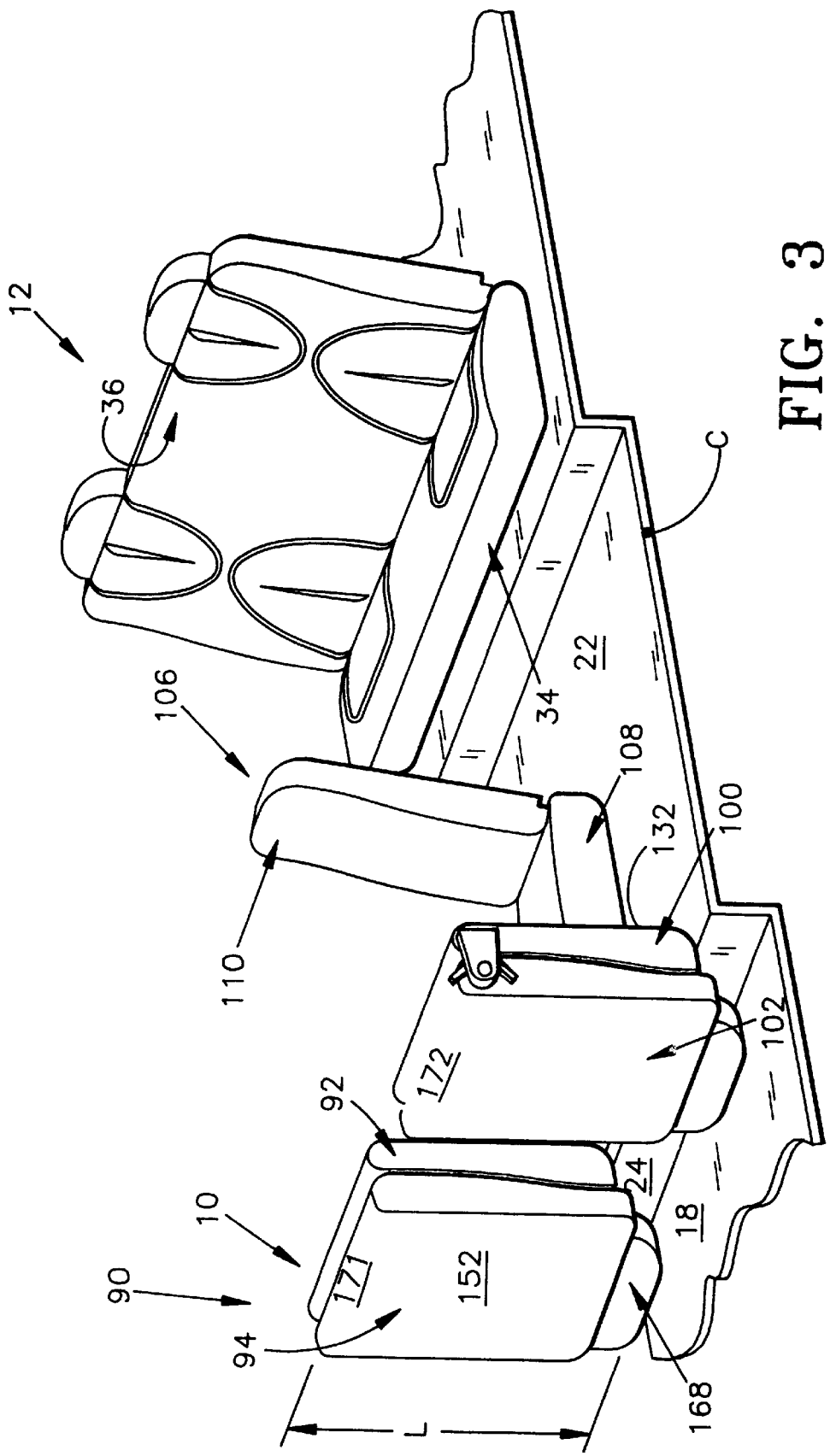
FIG. 3 is a perspective view of the present invention showing the first and second seats positioned differently than that shown in FIG. 2.
Figure 4:
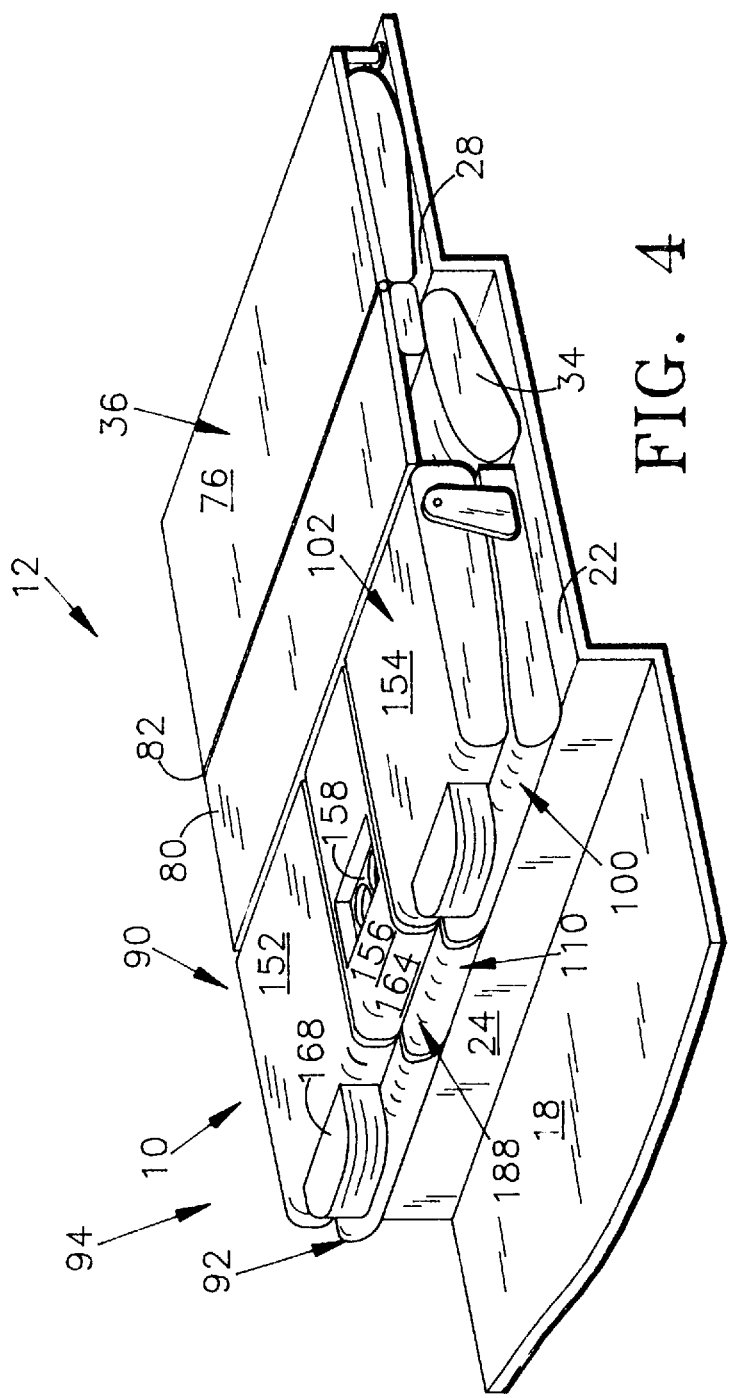
FIG. 4 is a perspective view of the present invention showing the seats positioned differently than that shown in FIG. 3.

The second seat 12 will be described in more detail below with reference to FIGS. 1 and 6. For purposes of clarity, the parts of the first and second seats 10, 12 will be named with regard to their position when the seats 10, 12 are in their upright, passenger carrying position (as depicted in FIG. 2) although the relative positioning of the components will change when the seats 10, 12 are moved between their passenger carrying position (FIG. 2), their cargo carrying position (FIG. 7) and the "ingress" position (FIG. 3).

The femur portion 34 of the second seat 12 is generally shaped like an elongated pillow, and includes an upper surface 42, an underside surface 44, a forward side surface 46, and a rearward side surface 48. The femur portion 34 also includes a left side surface 60 and a right side surface (not shown). One or all of the various surfaces 42–48 can be covered in an appropriate material, such as cloth, velour, leather or vinyl. The interior of the femur portion 34 includes a plurality of springs (not shown) attached to an inner frame, as is conventionally used on vehicle seats. A pivotable coupler (not shown) is provided for connecting the second seat 12 to the third platform 28 of the floor 14, to permit the femur portion to pivot between its seating position (shown in solid in FIG. 6) to its cargo carrying position (shown in phantom in FIGS. 6 and 7). It should be noted that when the femur portion 34 is in its cargo carrying position, the upper surface 42 of the femur portion 42 remains in an upwardly facing position, with the lower surface 44 remaining in a downwardly facing position.

The back portion 36 includes a forward facing back engaging surface 70, a bottom surface 72, a top surface 74 (which can be the top surface of a headrest 85), and a generally planar, reinforced rear surface 76. The forward facing back engaging surface 70 is preferably contoured to provide good back support. The planar rear surface 76 should be formed of a reinforced material, such as particle board, so that the rear surface 76 can bear and support a load placed thereon when the back portion 36 is placed in its second, or cargo carrying position as shown in FIG. 7. A reinforced bridge member 80 is hingedly coupled by a hinge member 82 to the rear surface 76 of the second seat, and is movable about the axis formed by the hinge 82 between a storage position, shown in solid in FIG. 6, wherein the bridge member 80 is disposed in a parallel plane with the back surface 76, and a use or cargo carrying position. The bridge member 80 is shown in its cargo carrying position in phantom FIG. 1, to extend between the second seat 12, and a lip 75 formed on the back portion of the first seat 10, for forming a bridge therebetween, to create a relatively planar cargo surface for the vehicle.

By being "reinforced," is not necessary that rear surface 76 and bridge 80 include reinforcing members, so long as the rear surface 76 and bridge 80 are made of a material, such as particle board, plywood or metal, which is capable of maintaining its planar shape under the normal cargo loads placed thereon. As such, it differs from the upper surface 42, and front surface 70, that are designed to be pliable to better accommodate the contours of a user's body. The rear surface 76 and bridge 80 can be constructed from a particle board member having a thickness of approximately 4.5 mm, which is overlain by either a carpet or vinyl mat. For further reinforcement, the rear surface 76 and bridge 80 may include one or more reinforcing ribs.

A coupler means that includes a bracket 84 is provided for supporting the back portion 36 above the third platform 28. A pivot means, such as a pivot pin 86, can be pivotably coupled to one or both of the back portion 36 and bracket 84, to permit the back portion 36 of the seat 12 to pivot in a direction indicated by arrow D, between its first position (the upright, passenger carrying position, shown in solid in FIG. 6), and its second position (the folded, cargo carrying position shown in phantom in FIG. 6).

As shown in FIG. 1, the back portion 36 of the second seat 12 can also include a pair of headrests 83, 85. Although the headrests can be formed as an integral part of the back portion 70, the headrests 83, 85 shown are formed separately, and are adjustably positionable with respect to the back portion 36.

The second seat 10 is a multi-section, split-bench seat having a first-seat section 90, a second-seat section 98, and a third-seat section 106. The first and second-seat sections 90, 98 are end sections, and the third-seat section 106 is a middle section disposed between the first 90 and second 98 seat sections.

Seat 10 is a split-bench seat, because each of the three sections 90, 98, 106 are movable independently of each other. However, unlike conventional split-bench type front seats, the three sections 90, 98, 106 share a common coupler member, and are generally not movable in a "back-and-forth" direction independently of each other.

The first section 90 includes a femur portion 92 upon which the user can rest his/her thighs and buttocks, and a back portion 94 against which the passenger can rest his/her back. The second-seat section 98 also includes a femur portion 100 and a back portion 102. Further, the third-seat section 106 also includes a femur portion 108 and a back portion 110.

The femur portions 92, 100, 108 of the three sections 90, 98, 106 each contain an upper surface 112, 114, 116, a forward surface 118, 120, 122, and a rearward facing surface 128, 130, (not shown), respectively. Each of the femur portions 92, 100, 108 also includes an underside surface, such as underside surface 132 of second-seat section 98 (FIG. 6); and left and right side surfaces, such as the left-side surface 124 of second section 98. The upper surfaces 112, 114, 116, forward surfaces 118–122, rearward surfaces 128, 130, and left and right-side surfaces, e.g., 124, are preferably covered with a cloth, leather or vinyl material. The underside surfaces of the first and second seat sections 90, 98 are covered with a material such as carpet, vinyl or molded plastic to protect the vehicle's occupants from exposed metal edges, springs and the like, when the seat sections 90, 98 are in their third positions.

Figure 5A:
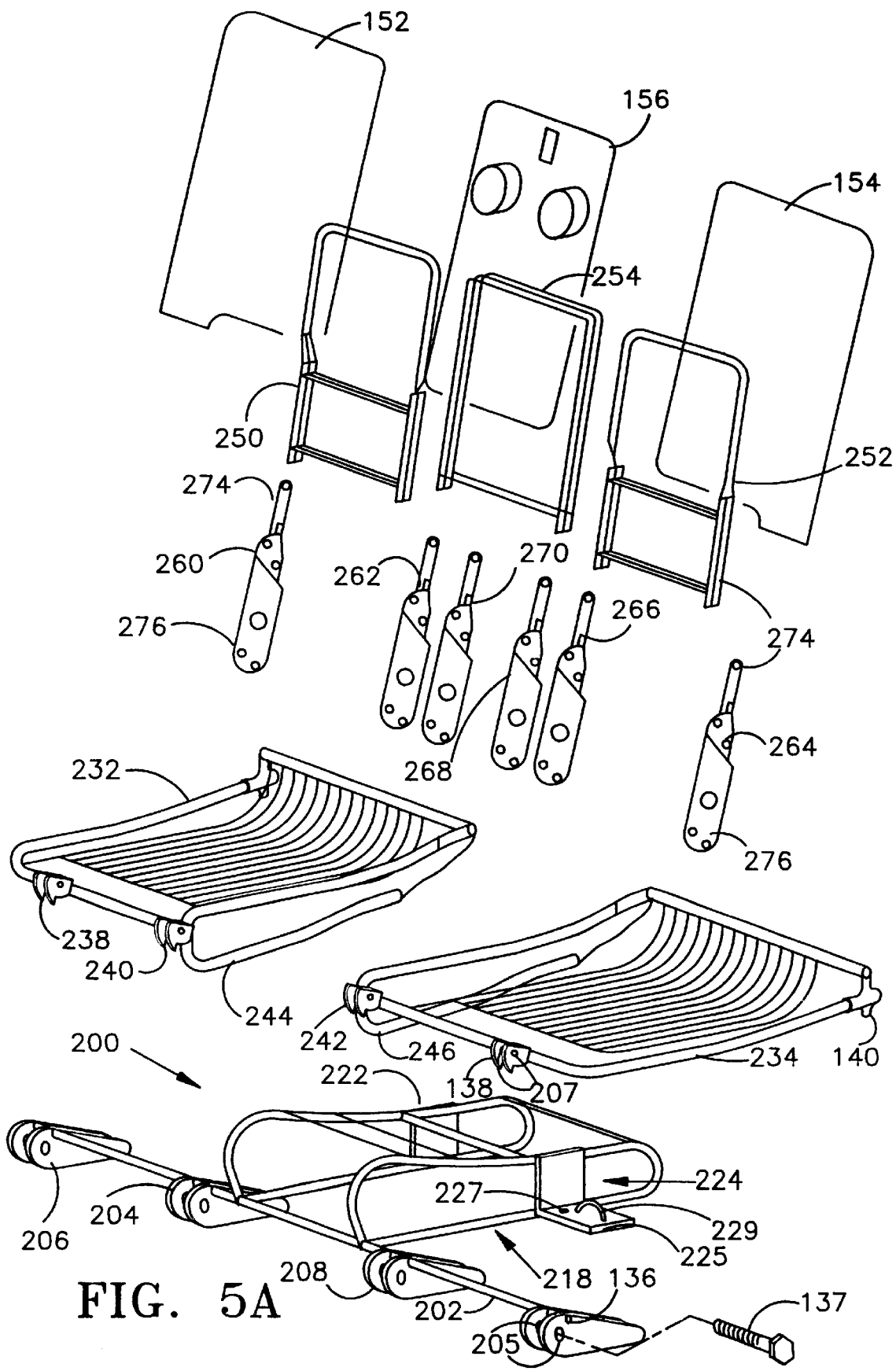
FIGS. 5A and 5B, when combined, are an exploded view of the seat of present invention.

The underside surfaces of the femur portions are disposed adjacent to the second platform section 22 of the floor 14, with the forward surfaces 118, 120, 122 being disposed adjacent to the first transition section 24. A coupler means 136 is provided for coupling the femur portions 92, 100, 108, and hence the seat sections 90, 98, 106 to the floor 14, and in particular to the forward portion of the second-platform section 22. As best shown in FIG. 5A, the coupler means (outboard pivot bracket) 136 is pivotably coupled by pivot pin 137 to a seat frame pivot bracket 138 that is fixed to the seat frame 234. This pivot connection permits the femur portion to pivot in a direction indicated generally by arrow E, about an axis defined by the pivot pin 137. A rear support member 140 is disposed adjacent to the rearward surface, e.g., 130, of each of the first and second-seat sections 90, 98 to support the rearward end of the femur portions 92, 100 thereof.

The back-support portions 94, 102, 110 of each of the first 90, second 98 and third 106 seat sections include a forward-facing, back-engaging surface 146, 148, 150, respectively, and reinforced, generally planar, rearward facing surfaces 152, 154, 156, respectively. Similar to the rearward surfaces, e.g. 76 (FIG. 6), of the second seat 12, the rearward surfaces 152, 154, 156 of the first seat 10 are reinforced to be generally nonpliable, and to bear loads when the respective seat sections 90, 98, 106 are in their cargo-carrying positions (FIG. 7). Preferably, the rearward surfaces 152, 154, 156 are covered with a carpet or vinyl material.

The rearward surface 156 of the third (or middle) seat section can include convenience members, here shown as recessed cup holders 158. In addition to the cup holders 158 shown, other convenience members can be provided, such as cigarette lighters, power outlets for providing electrical power to operate televisions, computers, mobile phones and the like, and cargo anchors to which securing means, such as belts and netting, can be attached for securing cargo being carried upon the rearward surfaces 152–156.

The back portions 94, 102, 110 also include top surfaces 160, 162, 164, respectively. In the embodiment shown in the drawings, adjustable headrests 168, 170 are attached to the back portions 94, 102 of the first and second-seat sections 90, 98 adjacent to the top surfaces 160, 162, 164 thereof. Headrests 168, 170 are of conventional design, and may include one or more downwardly extending rods 292 (FIG. 5) for coupling the headrests 168, 170 to the back portions 94, 102 of the first and second-seat sections 90, 98. The rods 292 make the headrests 168, 170 adjustably positionable with respect to the back portions 102, 110. Each of the back portions 94, 102, 100 also include bottom surfaces 171, 172, 173, respectively. The bottom surfaces 171, 172, 173 are generally disposed adjacent to the rearward portion of the upper surfaces 112, 114, 116 of the femur portions 92, 100, 108.

As best shown with regard to second section 98 in FIG. 3, the back portion 102 has a length, measured from the bottom surface 102 to the top surface of the headrest 170, which is generally greater than the length of the femur portion 100, measured from the forward surface 120 to the rearward surface 130 thereof. Each of the three sections 92, 98, 106 includes a back pivot means for pivotably coupling the respective back portions 94, 102, 110 to the femur portions 92, 100, 108, respectively.

Turning now to FIG. 1, and in particular to the second-seat section 98 shown therein, the pivot means can comprise a pivot bracket 182 that is fixedly coupled to the femur portion 100, and pivotably coupled to the back portion 102 by a back pivot member 184. The back pivot member 184 provides a pivot point for the back portion 102 which is spaced a few inches from the bottom surface 172 of the back portion 102, so that when the back portion 102 is pivoted about pivot member 184 into a position wherein the femur portion 100 and back portion 102 are disposed in a generally parallel relationship, the bottom surface 172 of the back portion 102 overhangs the rearward surface 130 of the femur portion 100, and the top surface 181 of headrest 170 overhangs the forward surface 120 of the femur portion 100. Through this overhanging relationship, the top surface 181 of the headrest can be positioned at or above the surface of the floor 14, to allow the back portion 102 and femur portion 100 to each be disposed at about a 90° angle to the platform sections 18, 22 of the vehicle floor 14.

A unitary actuator lever 186 is coupled to the pivot bracket housing 182. The actuator 186 is a three-position actuator, which is movable between a rest position, a first-release position, and a second-release position. In the rest position, the back latch means that is coupled to pivot members 184 and 138, are engaged to prevent pivotal movement. In the first-release position, the back latch means coupled to pivot member 184 is released to thereby permit the back portion 102 to pivot about pivot member 184. When the actuator 186 is moved into its second-release position, the coupler latch means which engages the coupler pivot means 138 is released, to permit the femur portion 100, to pivot about the pivot member 138. As the back portion 102 is coupled to the femur portion 100, movement of femur portion 100 about pivot member 138 also allows the back portion 102 to move. Although for clarity, the actuator 186 is shown as being positioned adjacent the "outboard" surface 124 of the second section 98 femur portion 100, the actuator is preferably positioned adjacent to the "inboard" side surfaces of each of the first and second seat section 90, 98 femur portions 92, 100.

Figure 5B:
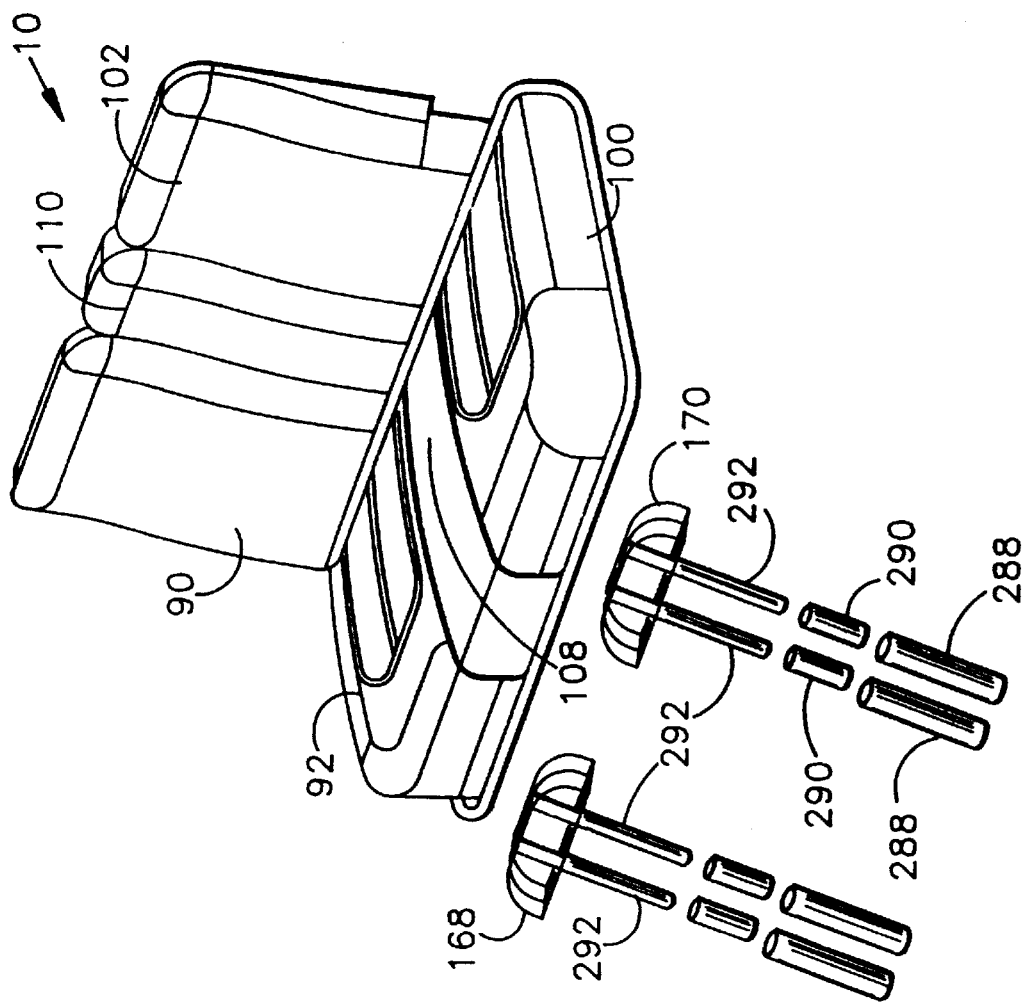

The mechanical components of the first seat 10 are best shown in FIGS. 5A and 5B, as including a coupler means 200 that couples the first seat 10 to the floor 14 of the vehicle. The coupler means 200 includes a laterally extending bar-like coupler frame 202 that extends generally across the full width of the seat, and is coupled to each of the first 90, second 98, and third 106 seat sections. The coupler frame 202 includes a first seat section inboard bracket 204, and a first seat section outboard bracket 206. The inboard and outboard brackets 204, 206 are provided for coupling the coupler frame 202 to the first seat section femur portion seat frame 232. The brackets 204, 206 each include one or more flanges (not shown) that are disposed generally parallel to the floor, and are positioned adjacent to the vehicle floor 14. The flanges include apertures (not shown) through which bolts (not shown) can pass for anchoring the brackets 204, 206 and, hence, the coupler frame 202 to the floor 14 of the vehicle.

The coupler frame 202 also includes a second seat section inboard bracket 208, and a second seat section outboard bracket 136. The inboard and outboard brackets 208, 136 of the second seat section 98 are generally similar to the inboard and outboard brackets 204, 206 of the first seat section 90. However, because of their position, the first seat section 90 inboard and outboard brackets 204, 206 may be configured as mirror images of the second seat section 98 inboard and outboard brackets 208, 136. Each of the inboard brackets 204, 208 and outboard brackets 206, 136 also include pivot pins e.g. 137 which pass through apertures, e.g. 205, 207 in the respective pivot brackets, e.g. 136, 138 that are attached to the coupler frame 202 and seat frame 234. The pivot pins 137 are disposed generally parallel to the bar-like coupler frame 202, and form the pivot axes about which the femur portions 92, 100 can pivot.

The coupler frame 202 also includes a third seat section seat frame 218 that comprises the skeleton for the femur portion 108 of the third seat section 122. The third seat section seat frame 218 includes a shell over which the cloth cover of the femur portion 108 is draped, along with support springs for supporting a passenger sitting on the femur portion 108. A first seat section rear mounting bracket 222 and second seat section rear mounting bracket 224 are mounted to the third seat section seat frame 218 for securing and supporting the respective inboard rear corners of the first and second seat frames 232, 234. The rear, inboard corner mounting brackets 222, 224 also may include horizontally extending flanges e.g. 225 containing apertures e.g. 227 through which bolts (not shown) can pass for anchoring the mounting brackets 222, 224, and hence the coupler frame 202 to the floor 14. The bolts (not shown) can also be used for mounting seat belts adjacent to the seat 10. Additionally, the inboard rear mounting brackets 222, 224 include a latch receiving means such as a latch striker that is similar to the latch striker used on the front door latch mechanism of current Chrysler Corporation light truck vehicles for receiving a latch carried on the first and second section femur portion seat frames 232, 234 for selectively releasably securing the seat frames 232, 234 to the rear mounting brackets 222, 224. The latch mechanism employed can bear a general similarity to the primary latching mechanisms used on front doors of current Chrysler Corporation light truck vehicles.

The rear, inboard corner mounting brackets 222, 224, each include a latch receiving means (not shown) 229 for receiving a latch mechanism carried by the first and second seat sections 90, 98 respectively. The latch mechanisms are mounted to the seat frame by being mounted directly to inboard disposed support members 244, 246.

The first seat section femur portion seat frame 232 includes a first seat section outboard pivot bracket 238 and a first seat section inboard pivot bracket 240. Similarly, the second seat section femur portion seat frame 234 includes an outboard pivot bracket 138 and an inboard pivot bracket 242. Each of the first and second seat frames 232, 234 also includes the inboard disposed support member 244, 246.

The seat components also include a first seat section back portion seat frame 250, a second seat section back portion seat frame 252, and a third seat section back portion seat frame 254. These back portion seat frames 250, 252, 254 provide structural rigidity and support for the back portions 94, 102, 110 and serve as skeletons over which the seat cloth and seat pads (not shown) are draped. The relatively rigid rearward facing surfaces 152, 154, 156 are attached to the respective first, second and third back portion seat frames 250, 252, 254.

Back portion mounting brackets are fixedly coupled to the first, second and third seat section back portion seat frames 250, 252, 254 for pivotally coupling the back portions 94, 102, 106 to the femur portions 92, 100, 108 of the first, second and third seat sections 90, 98, 106, respectively. The back portion mounting brackets include a first section outboard mounting bracket 260, first section inboard mounting bracket 262, a second section outboard mounting bracket 264, a second section inboard mounting bracket 266, a third section left side mounting bracket 268, and a third section right side mounting bracket 270. Each of the mounting brackets 260–270 includes an upper end having one or more apertures for fixedly coupling the mounting brackets 260–270 to the appropriate back portion seat frames 250, 252, 254. The mounting brackets 260–270 also include lower ends for pivotally coupling the seat frames 250, 252, 254 (and hence, the respective back portions 90, 98, 106) to the femur portion seat frames 232, 234, 218, and hence the respective femur portions 92, 100, 108.

The latch mechanism used for the third seat section 110 is preferably an inertia type latch mechanism. It should be noted that although the back support section 110 of the third seat section is latched to prevent movement, the femur support portion 108 is fixedly positioned and does not move, and hence needs no latch mechanism.

Each of the headrests 168, 170 includes a pair of headrest rods 292 for engaging the headrests 168, 170 to the back portion seat frames 250, 252, respectively. Two piece guide members, which include an inner headrest guide member 288 and an outer headrest guide member 290 are provided for each of the four headrest rods 292. Suitable inner and outer headrest guide members 288, 290 are available from Lear Corporation, and are similar to those used currently on many vehicles manufactured by Chrylser Corporation.

The operation of the seat system of the present invention will now be described with reference to FIGS. 1–3, 6 and 7. Turning first to FIG. 2, the first seat 10 and second seat 12 are shown in their passenger carrying configuration. In this position, the femur portions 92, 100, 108 of the first, second and third seat sections 90, 98, 106 are disposed generally perpendicular to the respective back portions 94, 102, 110. The femur portions 92, 100, 108 are resting on the second platform section of the floor 14. For maintaining the seat securely on to the floor 14, the latch mechanisms, fixedly couple the femur portions 92, 100 to the frame coupler member 202, and latch mechanisms fixedly couple the back portions 94, 102, 110 to the femur portions 92, 100, 108.

As the frame coupler member 202 is disposed generally adjacent to the front surfaces 118, 120, 122 of the femur portions 92, 100, 108, most of the mass of the seat 10 is disposed generally above and behind the laterally extending frame coupler member 202. Because the door opening is positioned generally between points B and C (FIG. 2), passengers can gain easy access to the first seat 10, as the door opening is adjacent to the first platform 18. However, as the C pillar is positioned generally at point C, ingress and egress from the second seat 12 can not be accomplished without some difficulty, such as by climbing over the first seat 10, or by entering the vehicle through the tailgate, and then climbing over the second seat 12.

To enable a passenger to gain ingress to the second seat 12, the latch means can be actuated for either of the first seat section 90 or the second seat section 98 (or both) to move the seat sections 90, 98 into their passenger access configuration. To do this, for the second seat section 98, it is moved from its first or passenger carrying position (FIG. 2) into its second or cargo carrying position (FIG. 7). In order to move the second seat section 98 into the second position, the unitary latch actuator 186, and latch mechanism 344 is actuated to release the latch connection between the back portion 102 and the femur portion 100 of the second seat section 98, to permit the back portion 102 to fold forwardly to a position wherein the femur portion 100 and back portion 102 are disposed generally parallel to each other, and also parallel to the second platform section 22 of the floor 14.

The unitary latch actuator 186 is then moved into its femur portion disengaged position, wherein the latch mechanism becomes disengaged from striker 229 that is mounted on the second section inboard mounting bracket 224 (FIG. 5A), to permit the femur portion 100 to pivot about an axis formed by the pivot member 137. This allows both the femur portion 100 and the back portion 102 to move into the third position, shown in FIG. 1. In the third position, the femur portion 100 and back portion 102 are disposed generally parallel to each other, and also generally perpendicular to the horizontally disposed floor platform sections 18, 22. When so placed in the third position, both the femur portion 100 and back portion 102 are disposed generally forwardly of the laterally extending bar-like coupler frame 202 and are positioned over the vertical transition portion 24 and first platform section 18 of the floor 14. As the first platform section 18 is at a lower level than the second platform section 22, the overhang of the headrest 170 can be accommodated to allow the femur portion 100 and back portion 102 to be placed generally at a 90° angle to the horizontal floor sections 18, 22, with the upper surface 181 of the headrest 170 still being placed above the floor 18.

When the second seat 98 is placed in the third position, the second seat section 98 and door opening (which is generally between points B and C in FIG. 1) are positioned to permit easy ingress through the door to the area of the horizontal platform section 22 on which the femur portion 100 rests when the second seat section 98 is in its first position. By placing the second seat section in the third position, a passenger can gain easy access to the second seat 12 through the left side rear door.

The first seat section 90 is movable similarly to the second seat section 98. First seat 90 can also be placed in a first position (FIG. 1), wherein the femur portion 92 and back portion 94 are disposed generally perpendicularly, with the femur portion 92 being disposed generally parallel to the second horizontal platform section 22, and the back portion 94 being disposed generally perpendicular to the second platform section 22. The first seat section 90 can then move into a second position (FIG. 7), where the femur portion 92 and back portion 94 are generally parallel to each other, and also parallel to the second horizontal platform section 22. By movement of the latch means, the first seat section 90 can be rotated to its third position (FIG. 3). Because each of the first and second seat sections 90, 98 are moveable into the their third positions, ingress and egress to and from the second seat 12 can be gained from either the left side or right side rear doors.

The middle or third seat section 106 is moveable between a first position (FIG. 2) where the femur portion 108 is disposed generally perpendicular to the back portion 110, and a second position (FIGS. 1 and 7), where the back portion 110 is disposed generally parallel to the femur portion 108. In the first position, the back portion 110 is disposed generally perpendicular to the second platform section 22 of the floor 14, and the femur portion 108 is disposed generally parallel to the second platform section 22. In the second position, both of the femur portion 108 and back portion 110 are disposed parallel to the second platform section 22. The femur portion 108 of the second seat section, unlike the femur portions 92, 100 of the first and second seat sections 90, 98, is not moveable into a third position. Such movement is not necessary because the first and second seat sections 90, 98 provide adequate ingress to the second seat 12.

In FIG. 7, each of the first, second and third seat sections 90, 98, 106 are shown in their second, or cargo carrying position. When each of the sections 90, 98, 106 is placed in its cargo carrying position, the rearward surfaces 152, 154, 156 of the back portions of the respective seat sections 90, 98, 106 are disposed generally co-planarly to foster the carrying of cargo thereon.

Figure 6:
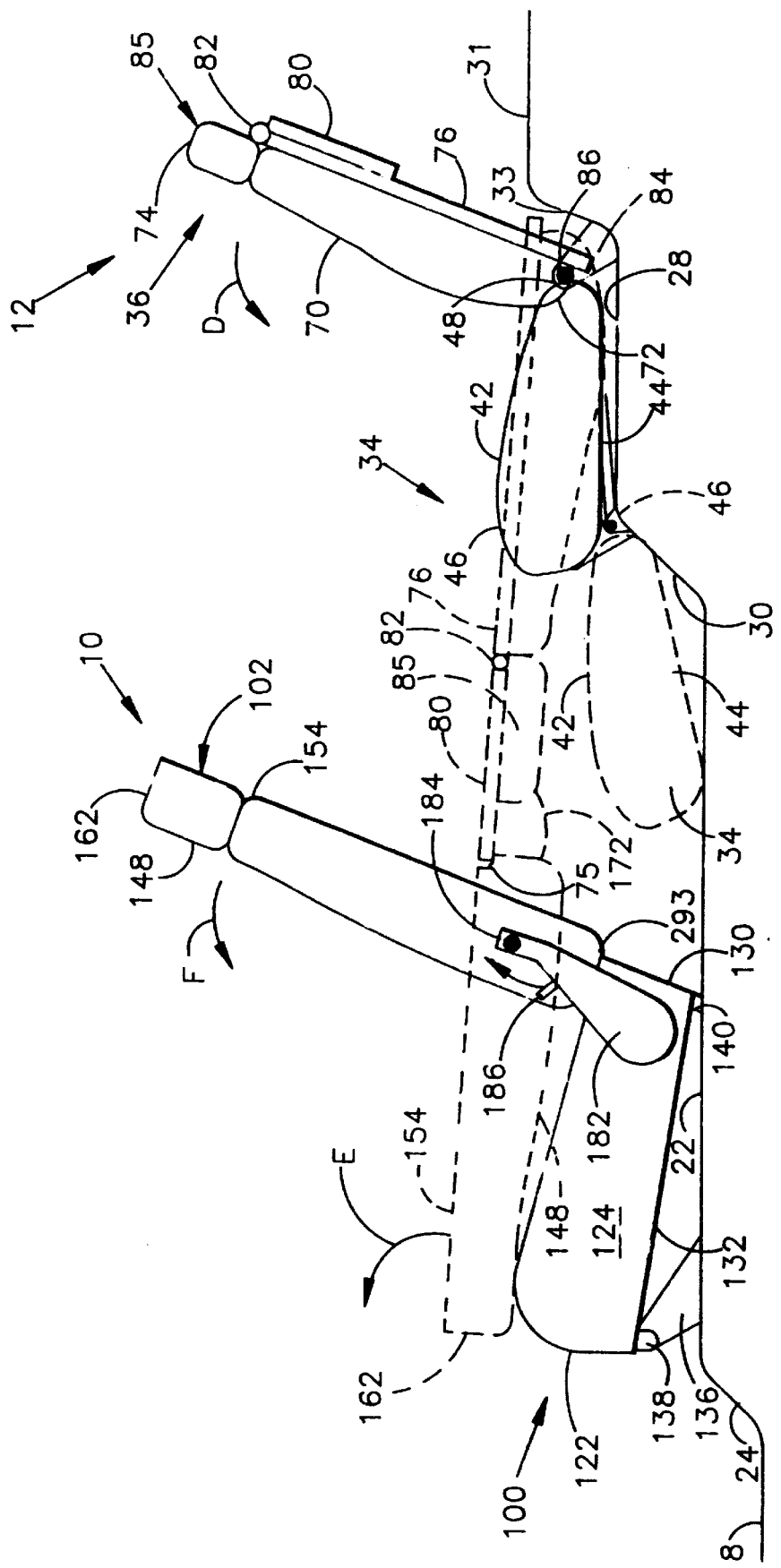
FIG. 6 is a side view of the first and second seats of the present invention.

Turning now to FIG. 6, the rear seat 12 is moveable between a first or passenger carrying position (as shown in solid) wherein the back portion 36 is disposed generally parallel to the femur portion 34; and to a cargo carrying position (shown in phantom) wherein the back portion 36 and bridge member 80 are disposed generally parallel, and almost co-planar with the fourth platform section 31 of the floor. When in the passenger carrying position, the back portion 36 and bridge member 80 are disposed generally perpendicular to the third and fourth platform sections 28, 31.

As shown in FIGS. 6 and 7, when the first and second seats 10, 12 are each placed in their cargo carrying position, a generally planer, cargo carrying surface is formed which extends generally from the front top surfaces 160, 162, 164 of the first, second and third seat sections 90, 98, 106 of the first seat 10, to the tailgate (rear hatch) (not shown) of the vehicle. This generally planer cargo surface permits the vehicle to carry a large amount of cargo.

Because of the ability of the first and second seats to be moved independently, and of the first, second and third seat sections 90, 98, 106 to be moved independently, a wide of variety of seating and cargo carrying configurations are possible.

As shown in FIG. 2 each of the first and second seats 10, 12 can be placed in their first or passenger carrying positions to maximize the passenger carrying capacity of the vehicle. As both the first and second seats 10, 12 are full width seats, the first seat 10, is capable of carrying three passengers and the second seat 12 is capable of carrying two passengers, (but would be capable of carrying three passengers if not restricted by the wheel wells). If coupled with a bench type front seat, the vehicle would then be capable of carrying eight passengers. For times when less passenger carrying capacity is needed, the second seat 12, alone, can be folded into its cargo carrying position. This provides a cargo area extending between the back surfaces 152, 154, 156 of the first seat 10 and the rear hatch of the vehicle. In such a configuration, the vehicle maintains a substantial cargo carrying capacity while still permitting five or six passengers to be carried.

Another variation on this seating arrangement is suggested by FIG. 1, wherein the first seat section 90 is shown in its passenger carrying position, and the third seat section 106 is shown in its cargo carrying position. In this position, the third seat section 106 has the potential to serve as an arm rest for a passenger sitting in the first seat section 90. Further, the third seat section can serve as a "pass through" for accomodating long length cargo, such as boards. Additionally, it provides a passenger in the first seat section 90 with a place to place a drink in the cup holders 158. Alternately, the rearward facing surface 156 of the third section 106 can serve as a work surface. Because rearward facing surface 156 is elevated slightly (vis-a-vis the upper surface 112 of the femur portion 92 of the first seat section), the upper surface 156 can serve as a stand for a computer, or as a writing surface.

Although not shown in FIG. 1, the second seat section 98 can also be placed in its first, or passenger carrying position, with the third seat section 106 remaining in its cargo carrying position. This configuration might be favored by parents of children who desire to place one child in the first seat section 90, and the second child in the second seat section 98, and maintain some separation therebetween. In such case, the rearward surface 156 of the third seating section 106 can serve as a game surface on which, for example, a magnetic checkerboard can be placed to provide a diversion for the children during long trips. Alternately, the rearward facing surface 156 can provide a work surface, or a telephone stand. No doubt, other configurations of the seats are also possible to serve a variety of specialized purposes or desired ends.

Having described the invention in detail, it will be appreciated that variations and modifications exist within the scope and spirit of the claims appended hereto.

What is claimed is:

1. A vehicle seat comprising:
   a first seat section including a femur portion pivotally connected to a floor of a vehicle and a back portion pivotally connected to the femur portion;
   a second seat section including a femur portion pivotally connected to the floor and a back portion pivotally connected to the femur portion;
   a third seat section including a femur portion connected to the floor and a back portion pivotally connected to the femur portion;
   the first and second seat sections being independently movable between a first position wherein the femur portion is generally parallel to the floor and the back portion is generally perpendicular to the floor, a second position wherein the femur portion and the back portion are both generally parallel to the vehicle floor, and a third position wherein the femur portion and back portion are both disposed generally perpendicular to the vehicle floor; and
   the third seat section being disposed adjacent to and between said first and second seat sections and being movable independent of said first and second seat sections between a first position wherein the femur portion of said third seat section is generally parallel to the vehicle floor and said back portion of said third seat section is generally perpendicular to the vehicle floor, and a second position wherein the femur portion and back portion are both disposed generally parallel to the floor.

2. A vehicle seat comprising:
   (a) a coupler means for connecting the seat to a floor of the vehicle;
   (b) a first seat section including a femur portion pivotally connected to the coupler means and a back portion pivotally connected to the femur portion;
   (c) a second seat section including a femur portion pivotally connected to the coupler means and a back portion pivotally connected to the femur portion; and
   (d) a third seat section including a femur portion connected to the coupler means and a back portion pivotally connected to the femur portion;
   (e) the first and second seat sections being independently movable between
      (1) a first position wherein the femur portion is generally parallel to the vehicle floor and the back portion is generally perpendicular to the vehicle floor;
      (2) a second position wherein the femur portion and the back portion are both generally parallel to the vehicle floor; and
      (3) a third position wherein the femur portion and back portion are both disposed generally perpendicular to the vehicle floor; and
   (f) the third seat section being movable independent of said first and second seat sections between
      (1) a first position wherein the femur portion is generally parallel to the vehicle floor and the back portion is generally perpendicular to the vehicle floor; and
      (2) a second position wherein the femur portion and back portion are both disposed generally parallel to the vehicle floor.

3. The vehicle seat of claim 2 further comprising a coupler pivot means for pivotally coupling the femur portions of the first and second seat sections to the coupler means, the coupler pivot means being positioned for permitting the first and second seat sections to pivot between their second positions wherein the femur portions are disposed predominantly behind the coupler means, and their third positions wherein the femur portions are disposed predominantly in front of the coupler means.

4. The vehicle seat of claim 2 wherein the vehicle seat comprises a split-bench-type vehicle seat, and the coupler means includes a main coupler member to which each of the first, second and third seat sections are coupled.

5. The vehicle seat of claim 2 further comprising a first coupler pivot means for pivotally coupling the first seat section to the coupler means, and a second coupler pivot means for pivotally coupling the second seat section to the coupler means, the first and second coupler pivot means being positioned for permitting the respective first and second seat sections to pivot between their second positions wherein the femur and back portions are disposed predominantly behind the coupler means, and their third positions wherein the femur and back portions are disposed predominantly in front of the coupler member.

6. The vehicle seat of claim 2 further comprising
   (a) a first back pivot means for pivotally coupling the femur portion and back portion of the first seat section;
   (b) a second back pivot means for pivotally coupling the femur portion and back portion of the second seat section; and
   (c) a third back pivot means for pivotally coupling the femur portion and back portion of the third seat section.

7. The vehicle seat of claim 2 wherein each of the back portions of the first, second and third seat sections include generally planar respective first, second and third rearward cover members, each of the rearward cover members and back portions being configured, when in the second position, to be disposed generally co-planar with the other of the first, second and third rearward cover members that are also in the second position.

8. The vehicle seat of claim 3 wherein at least one of the first, second and third rearward cover members includes at least one recessed cup holder member.

9. The vehicle seat of claim 2 further comprising a first back pivot means for pivotably coupling the femur portion and back portion of the first seat section, wherein
   (a) the femur portion of the first seat section includes a forward end portion, a rearward end portion, and a length;
   (b) the back portion of the first seat section includes an upper end portion, and a lower end portion; and
   (c) the first back pivot means, femur portion and back portion are configured so that when the femur and back portions are in at least one of the second and third positions, the upper end portion of the back portion overhangs the forward portion of the femur portion, and the lower end portion of the back portion overhangs the rearward portion of the femur portion.

10. The vehicle seat of claim 9 wherein
    (a) the lower end portion of the back portion of the first seat section has a length generally greater than the femur portion;
    (b) the lower end portion overhangs the rearward portion of the femur portion when the femur portion and back portion are in at least one of their first and second positions; and
    (b) the back pivot means engages the back portion of the first seat section at a distance from the lower end sufficient to permit the back portion to be positioned at about a 90° angle to the vehicle floor when the first seat section is in the third position.

11. The vehicle seat of claim 2 wherein the third seat section is disposed between the first and second seat sections.

* * * * *